United States Patent
Yamazaki (10) Patent No.: US 7,388,616 B2
(45) Date of Patent: Jun. 17, 2008

(54) ATTACHMENT STRUCTURE OF CAMERA MODULE AND PORTABLE TERMINAL DEVICE

(75) Inventor: Masato Yamazaki, Sagamihara (JP)

(73) Assignee: Kyocera Corporation, Takedatobadono-cho, Fushimi-ku, Kyoto-Shi, Kyoto (JP)

( * ) Notice: Subject to any disclaimer, the term of this patent is extended or adjusted under 35 U.S.C. 154(b) by 917 days.

(21) Appl. No.: 10/723,141

(22) Filed: Nov. 26, 2003

(65) Prior Publication Data
US 2004/0157652 A1    Aug. 12, 2004

(30) Foreign Application Priority Data
Nov. 29, 2002  (JP)  ............................. 2002-347072

(51) Int. Cl.
*H04N 5/225* (2006.01)
(52) U.S. Cl. ..................... 348/373; 348/374; 348/376
(58) Field of Classification Search ................ 348/373, 348/374, 376; 455/575.3, 556.1
See application file for complete search history.

(56) References Cited

U.S. PATENT DOCUMENTS

| | | | |
|---|---|---|---|
| 6,359,652 B1 * | 3/2002 | Takada | 348/374 |
| 6,665,455 B1 * | 12/2003 | Ting | 382/312 |
| 6,879,337 B2 * | 4/2005 | Tatehana et al. | 348/14.02 |
| 7,133,691 B2 * | 11/2006 | Kang | 455/556.1 |
| 7,180,546 B2 * | 2/2007 | Kobayashi | 348/374 |
| 7,218,732 B2 * | 5/2007 | Tanaka et al. | 379/433.13 |
| 2003/0137595 A1 * | 7/2003 | Takachi | 348/340 |

FOREIGN PATENT DOCUMENTS

| | | |
|---|---|---|
| JP | H03-30581 | 2/1991 |
| JP | H04-111686 | 4/1992 |
| JP | 5-323164 | 12/1993 |
| JP | H08-307886 | 11/1996 |
| WO | WO 01/15433 | 1/2001 |

OTHER PUBLICATIONS

English Translation of Abstract for Japanese Appl. No. JP5323164.
Japanese Office Action dated Dec. 4, 2007 with English translation.
English Translation of Abstract for Japanese Appl. No. JP5323164, (Dec. 7, 1993).

* cited by examiner

*Primary Examiner*—Lin Ye
*Assistant Examiner*—Richard M Bemben
(74) *Attorney, Agent, or Firm*—Schulte Roth & Zabel LLP; John C. Garces (57) ABSTRACT

An attachment structure of a camera module for attaching to a housing a camera module having an image capturing element portion mounted on a substrate and a lens portion provided on said image capturing element portion. The attachment structure includes an elastic member which is elastically deformed in a thickness direction, arranged between said substrate and said housing, and a latching portion provided on said housing. The camera module engages with said latching portion, and movement of said elastic member in the restoring direction is restricted.

6 Claims, 5 Drawing Sheets

ATTACHMENT STRUCTURE OF CAMERA MODULE AND PORTABLE TERMINAL DEVICE

CROSS-REFERENCE TO RELATED APPLICATION

This application claims priority from and incorporates herein by reference the commonly-assigned Japanese Patent Application Number 2002-347072, filed on Nov. 29, 2002 and entitled "Attachment Structure of Camera Module and Portable Terminal Device."

BACKGROUND OF THE INVENTION

1. Field of the Invention

The present invention relates to an attachment structure for attaching a camera module in a housing of a portable terminal device. Examples of such portable terminal devices include cellular phones, PHS (personal handy phones), PDAs (Personal Data Assistants), and notebook computers.

2. Description of Prior Art

The use of portable terminal devices such a cellular phones that are provided with a small camera module has grown increasingly common in recent years.

Of camera modules of this type, there is a design available that is provided with an image pickup part employing CCD (charge-coupled device) and a lens part for forming an image of an object on an image formation surface. The image pickup part and lens part are mounted on a substrate to form a unitary structure. The image pickup part may be joined to the substrate by soldering, while the lens part is attached by screwing into the image pickup part via a thread groove formed about the inner periphery thereof, for example. As is shown, for example, in Japanese Patent Application Laid-Open (JP-A) No. Heisei 05-323164, in a camera module that has been formed as a unitary structure in this manner, the image pickup part, lens part and substrate are connected in a strongly fixed manner, so that the strength of the camera module is increased.

However, when the above-described camera module experiences an impact load, that impact load is readily communicated to the entire structure, causing problems such as disrupting the image formation surface inside the image pickup part, negatively impacting internal parts of the camera module, etc. Conversely, if an attempt is made to reduce the transmission of impact load by decreasing the strength of the connections between the image pickup part, lens part and substrate, then other problems arise such as displacement of the optical axis of the lens part, and a deterioration in the original properties of the camera module. In particular, when the camera module is loaded in a portable terminal device, there is a high chance that it will experience an impact load from dropping, etc. of that device. For this reason, there has been a strong desire to create compatibility between the camera module's image pickup properties and its ability to absorb an impact load.

The present invention was conceived in view of the above-described circumstances and relates to an attachment structure for attaching a camera module, and to a portable terminal device employing this attachment structure, the present invention aiming to provide therein compatibility between the camera module's image pickup properties and its ability to absorb an impact load.

SUMMARY OF THE INVENTION

The first aspect of the present invention is an attachment structure for attaching a camera module to a housing. The camera module having an image capturing element portion mounted on a substrate and a lens portion provided on the image capturing element portion. An elastic member which is elastically deformed in a thickness direction, arranged between the substrate and said housing, and a latching portion provided on the housing. The camera module engages with the latching portion, thereby, the movement of the elastic member in the restoring direction is restricted.

In this camera module attachment structure, an elastic member is disposed between the housing and the substrate of the camera module. As a result, even if the housing experiences an impact load from the outside, this impact is absorbed by the elastic material, making it possible to reduce transmission of the impact load to the camera module. Further, latching parts are provided to the housing, these latching parts limiting movement of the camera module in the restoring direction of the elastic member. As a result, the camera module can be securely fixed in the housing, and positional displacement of the camera module can be prevented.

In addition, it is preferable that the substrate has a cover member which covers the image capturing element portion and is provided with an opening.

In this attachment structure of a camera module, a cover member is provided for covering, with clearance present, the image capturing element. As a result, the image capturing element can be protected. Further, when attaching the camera module in the housing, the latching parts of the housing do not need to engage directly with the image capturing element, but rather, can engage with the cover member of the camera module. Thus, it is possible to prevent damage from large forces acting on the image capturing element.

In addition, it is preferable that the latching portion comprises an elastic member standing at a periphery of an attachment area of the housing to which the camera module is attached, and a prong portion which can engage with the cover member. A tip portion projects towards the attachment area side and is provided on the elastic member.

In this attachment structure of a camera module, attachment of the camera module to its site of attachment on the housing is permitted by elastic deformation of the elastic pieces of the latching parts. Once the camera module has been attached, the elastic pieces of the latching parts return to their pre-elastically deformed state, and the prong parts of the latching parts engage with the top part of the cover member of the camera module. As a result, it is possible to prevent release of the camera module from its site of attachment in the housing. Further, the cover member is provided to the camera module for covering, with clearance present, the image capturing element, this cover member engaging with the latching parts. As a result, it is possible to prevent damage to or positional displacement of the image capturing element.

In addition, it is preferable that a guide surface for guiding the camera module, is formed on the prong portion, having a slanted shape between a tip surface and an end surface of the prong portion.

When attaching the camera module to its site of attachment in the housing, the camera module is pressed against the guide surfaces of the latching parts and, in this state, guided to its site of attachment. At the same time, the elastic piece of the latching parts undergoes elastic deformation in a direction away from the camera module's site of attachment. As a result, the attachment of the camera module to its site of attachment can be carried out easily.

The second aspect of the present invention is a portable terminal device having a camera module having an image capturing element portion mounted on a substrate and a lens portion provided on the image capturing element portion. The camera module is attached to a housing. The housing comprising, a first casing into which the camera module is attached, and a second casing for covering the first casing, and forming an open area for the lens portion, wherein the camera module is attached to the housing using the attachment structure of a camera module.

In this portable terminal device, it is possible to control rattling or tilting of the optical axis of the camera module, and to enable excellent image capturing to be performed. Further, even if the housing is subject to an impact load, it is difficult for the camera module to be damaged. In addition, because of the simple structure and attachment process, lower costs can be anticipated.

Note that the portable terminal device may include a camera module having an image capturing element portion mounted on a substrate and a lens portion provided on the image capturing element portion. A housing, to which the camera module is attached, the housing has a first casing into which the camera module is attached, and a second casing for covering the first casing, and forming an open area for the lens portion. An elastic member, which is elastically deformed in a thickness direction, arranged between the substrate and said housing, and a latching portion provided on the housing. The camera module engages with the latching portion, and movement of the elastic member in the restoring direction is restricted.

The third aspect of the present invention is a camera that has a camera module having an image capturing element portion mounted on a substrate and a lens portion provided on said image capturing element portion. A housing to which said camera module is attached, said housing comprising, a first casing into which said camera module is attached, and a second casing for covering said first casing, and forming an open area for the lens portion. The camera module is attached to said housing using the attachment structure for attaching a camera module.

DETAILED DESCRIPTION OF THE INVENTION

Preferred embodiments of the present invention will now be explained based on the accompanying Figures. Note that the following explanation employs as an example, a cellular phone in which, a camera module that employs the camera module attachment structure of the present invention has been mounted.

Figure 1:
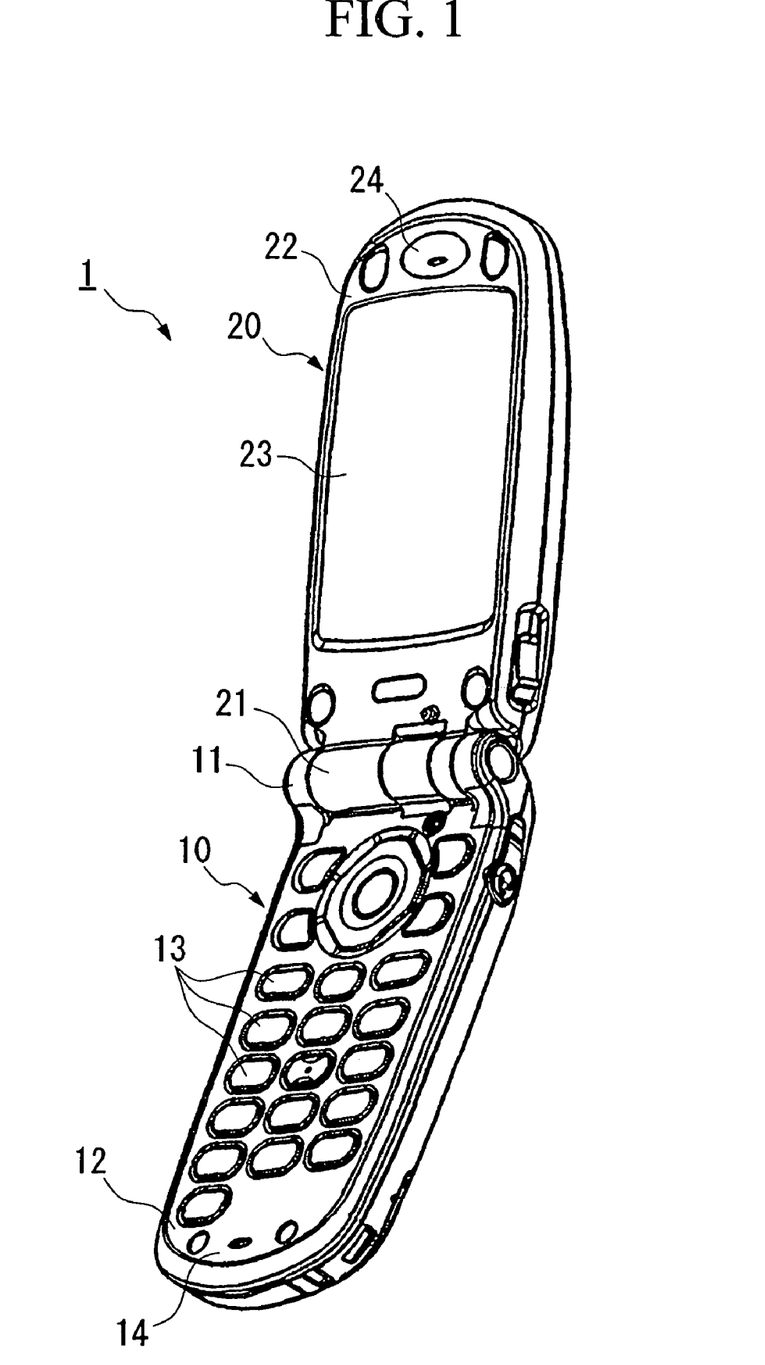
FIG. 1 is a perspective view of the cellular phone according to an embodiment of the present invention, as seen from its front surface.

Cellular phone 1 (portable terminal device) shown in FIG. 1 is designed as a foldable cellular phone having a first housing 10 and a second housing 20 that are formed in the shape of a flat, roughly rectangular parallelepiped. These housings stacking on top of one another when cellular phone 1 is folded. As shown in FIG. 1 the longitudinal direction of first housing 10 and second housing 20 is defined as the vertical direction. A first hinge 11 is provided at the top side of first housing 10, and a second hinge 21 is provided at the bottom side of second housing 20. By connecting these hinges 11 and 21 via a hinge shaft not shown in FIG. 1, first housing 10 and second housing 20 are joined to permit mutual rotation.

Various operational buttons 13 are arrayed on front face 12 of first housing 10. A communications microphone 14 is disposed at the bottom part of front face 12. A display 23, such as a liquid crystal display device, is disposed on the front face 22 of second housing 20, and a communications speaker 24 is provided on the top part of front face 22. The respective front faces 12 and 22 of first housing 10 and second housing 20 are the surfaces that lie on top of one another when either first housing 10 or second housing 20 is rotated approximately 180° about the axes of their respective hinges 11 and 21 to lay on top of the other housing, i.e., when cellular phone 1 is folded.

Figure 2:
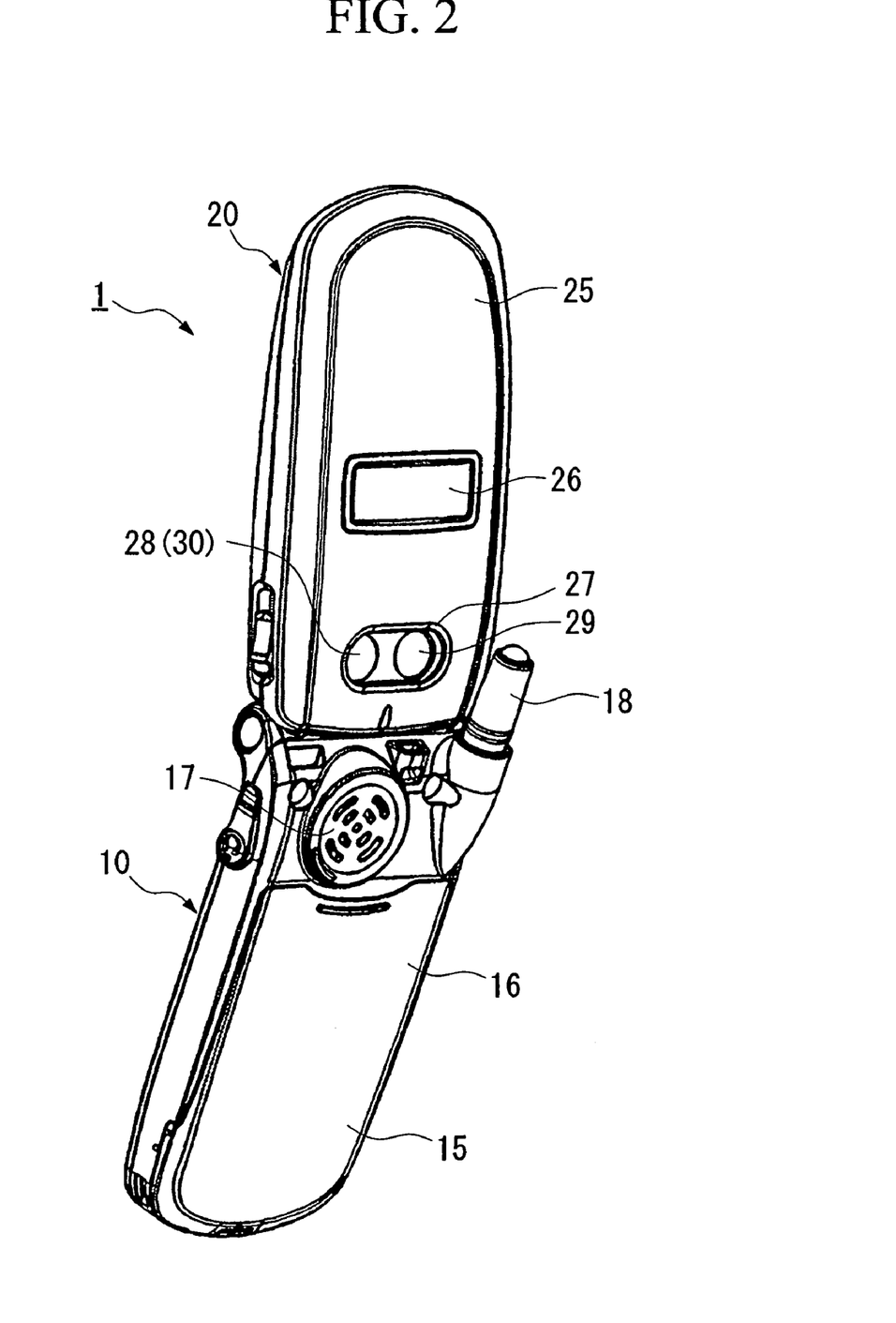
FIG. 2 is a perspective view of the cellular phone in FIG. 1, as seen from its rear surface.

As shown in FIG. 2, a battery 16 that can be released is attached to the back face 15 of first housing 10. A speaker 17 for incoming sound and a retractable antenna 18 are disposed at the top part of back face 15 on the left and right sides respectively with respect to a viewer facing back face 15. A simple display 26, such as a liquid crystal device, for showing time and signal is disposed in the center of back face 25 of second housing 20. A window 27 in the shape of an oblong elongated circle is provided on the hinge 21 end of back face 25 of second housing 20. A lens window 28 for camera module 30, which is housed inside second housing 20, is provided on the left side of second housing 20, as seen by a viewer facing window 27. In this cellular phone 1, lens window 28 is directed toward an object and a specific operational button is manipulated to enable the image of the object that is displayed on display 23 to be picked up. Note that a mirror 29 is provided on the right side when facing window 27, allowing the operator to check the composition when capturing his own image.

First housing 10 and second housing 20 are designed so that they can be separated into a front case and a back case along the direction of the thickness thereof. Various types of units like display 23 and operator buttons 13, as well as the circuit board and the like are housed inside these cases.

Figure 3:
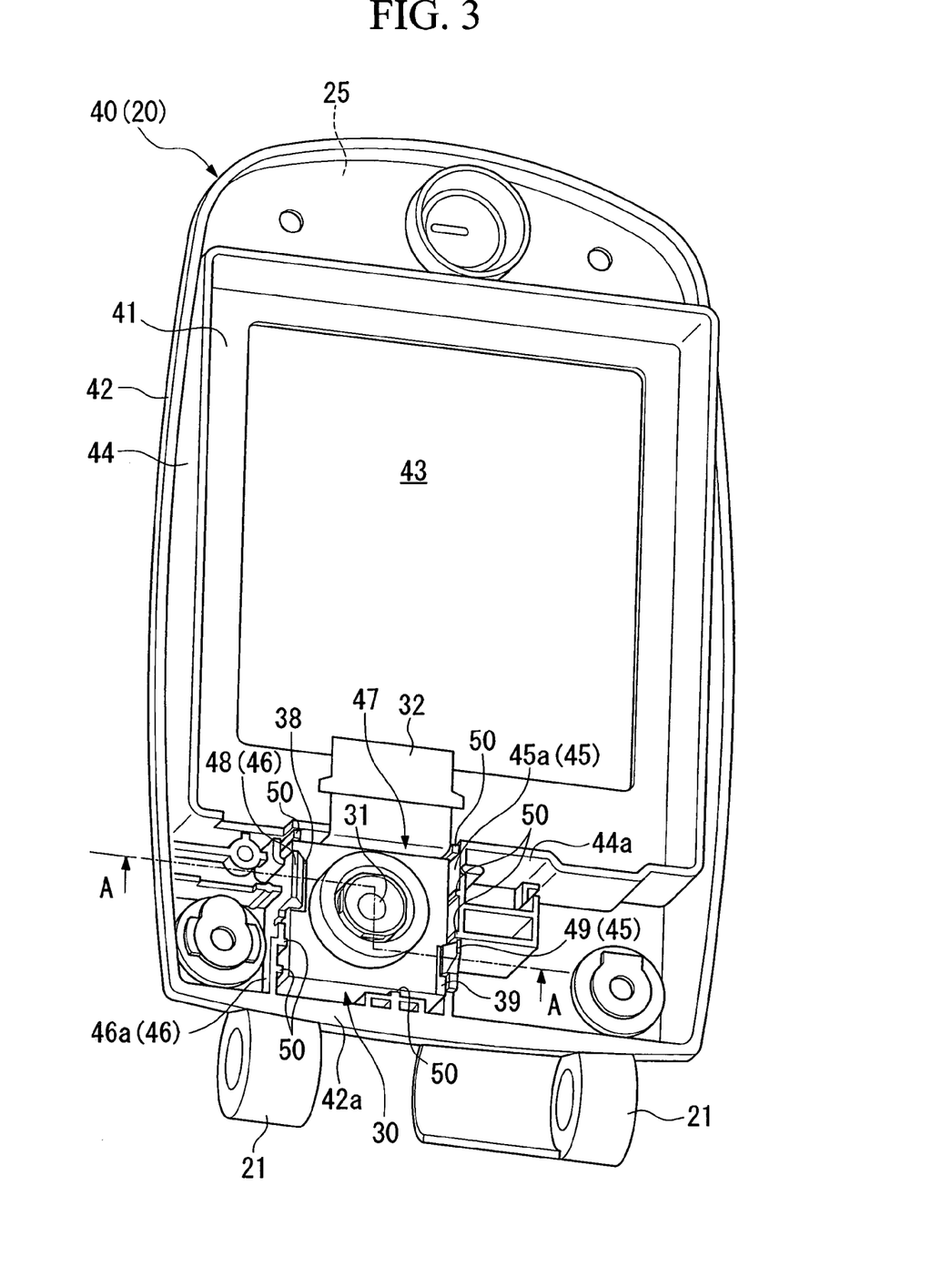
FIG. 3 is a perspective view of the front case of the second housing, as seen from the back.

As shown in FIG. 3, a case 40 on the front face 22 side of second housing 20 has a front wall 41, that forms front face 22, and a peripheral wall 42 extending around the entire periphery of case 40. Peripheral wall 42 is roughly normal to the back face 25 side. Note that second hinge 21 is provided at the bottom side of peripheral wall 42. An opening 43 is provided near the center of front wall 41 for exposing display 23 on front face 22. A rib 44 surrounding the entire periphery of opening 43 is upright, and runs from front wall 41 to the back face 25 side.

A pair of side walls (elastic pieces) 45a and 46a that vertically connect the bottom side 44a of rib 44 and the bottom side 42a of peripheral wall 42 are provided between bottom side 44a and bottom side 42a. Side walls 45a and 46a extend from front wall 41 and are upright with respect to the rear face 25 side. Side wall 45a is disposed at roughly a center position in the right to left direction of case 40, while side wall 46a is disposed to the left side of case 40.

These side walls 45 and 46a form a roughly square boundary along with bottom side 42a of peripheral wall 42 and bottom side 44a of rib 44.

The site surrounded by side walls 45a and 46a, bottom side 42a of peripheral wall 42 and bottom side 44a of rib 44 forms a roughly box-shaped housing (i.e., attachment site of camera module) 47 that is open on the back face 25 side. Camera module 30 is housed inside this box-shaped housing 47 in a state such that its optical axis is roughly parallel to the direction of the thickness of second housing 20, and lens surface 31 is directed toward back face 25 side. Note that numeric symbol 32 indicates a wiring board that can be curved which is attached to camera module 30.

Figure 4:
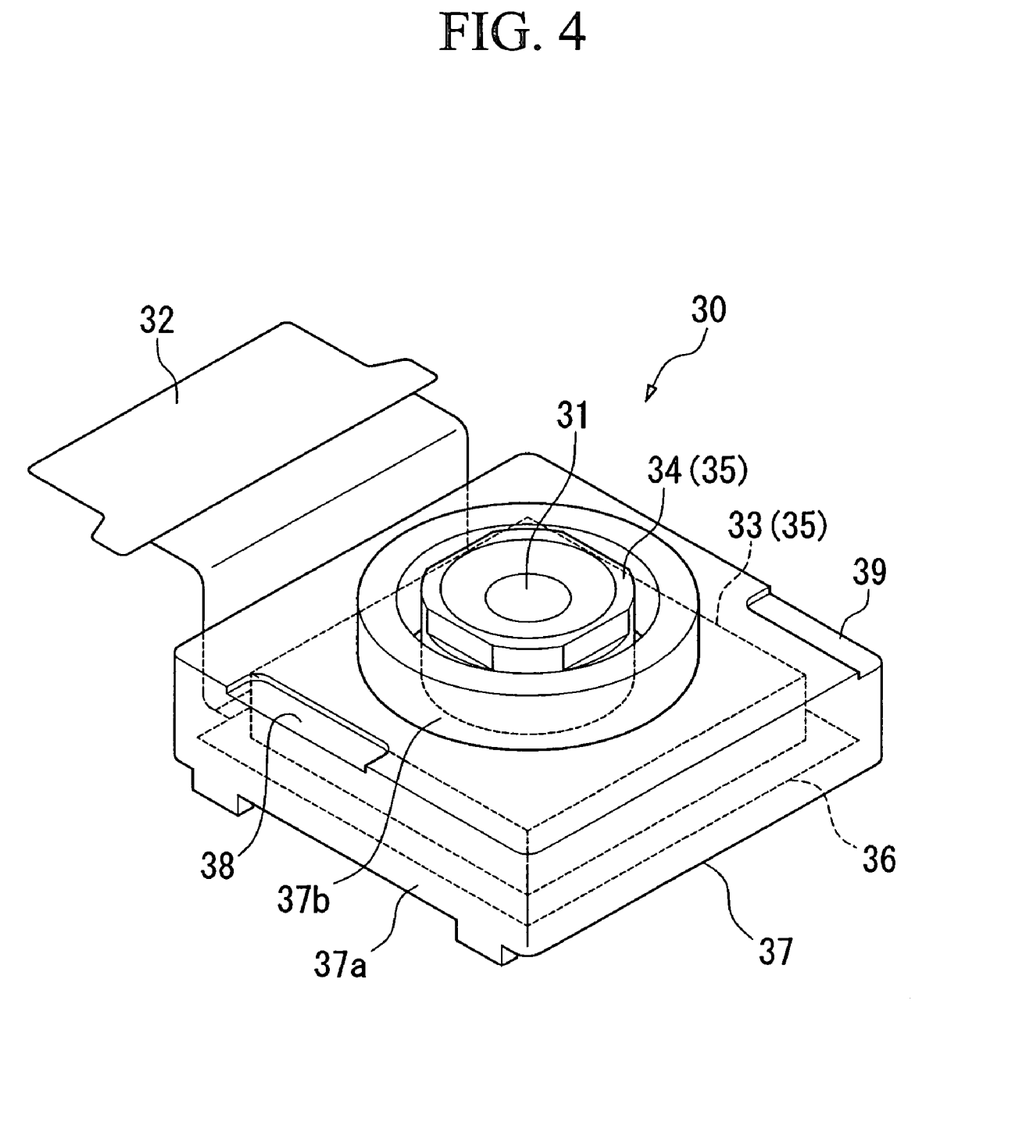
FIG. 4 is a perspective view of the camera module.

Here, as shown in FIG. 4, camera module 30 has an image capturing element 33 that has roughly the shape of a rectangular parallelepiped and houses a CCD or the like, and a cylindrical lens part 34 for forming an image of an object on the image pickup surface in image capturing element 33. The image capturing element 33 and lens part 34 join together to form an image pickup part 35. This image pickup part 35 is mounted on a substrate 36 which is disposed at the bottom surface (i.e., front face 22 side) of image capturing element 33, and is mounted there with soldering or the like. Note that wiring board 32 is connected to substrate 36. With the exception of an area around a lens surface 31, image pickup part 35 is covered with cover member 37, and is attached to substrate 36. Camera module 30 is formed from these main components of image pickup part 35, substrate 36 and cover member 37.

Cover member 37 is formed of a box-shaped part 37a for covering image capturing element 33, and a circular tube 37b for covering lens part 34. Latching surfaces 38, 39 are provided on the top surface (i.e., on the back face 25 side) of box-shaped part 37a, on the left upper and right lower areas respectively when facing lens surface 31. A latching prong (prong part) 49 corresponding to latching surface 39 is provided on side wall 45a and a latching prong (prong part) 48 corresponding to latching surface 38 is provided on side wall 46a which form housing part 47 in which camera module 30 is housed (see FIG. 3). Latching part 45 which can hold a camera module 30 that is housed in housing part 47 is formed from side wall 45a and latching prong 49. Similarly, latching part 46 is formed from side wall 46a and latching prong 48. Here, as shown in FIG. 3, the positioning of camera module 30 in the up, down, right and left directions when it is stored in housing part 47 is performed by means of a plurality of projections 50 that are provided extending in the thickness direction of second housing 20. These projections 50 are provided at each side wall 45a and 46a, and at the bottom side 44a of rib 44 and the bottom side 42a of peripheral wall 42.

Figure 5:
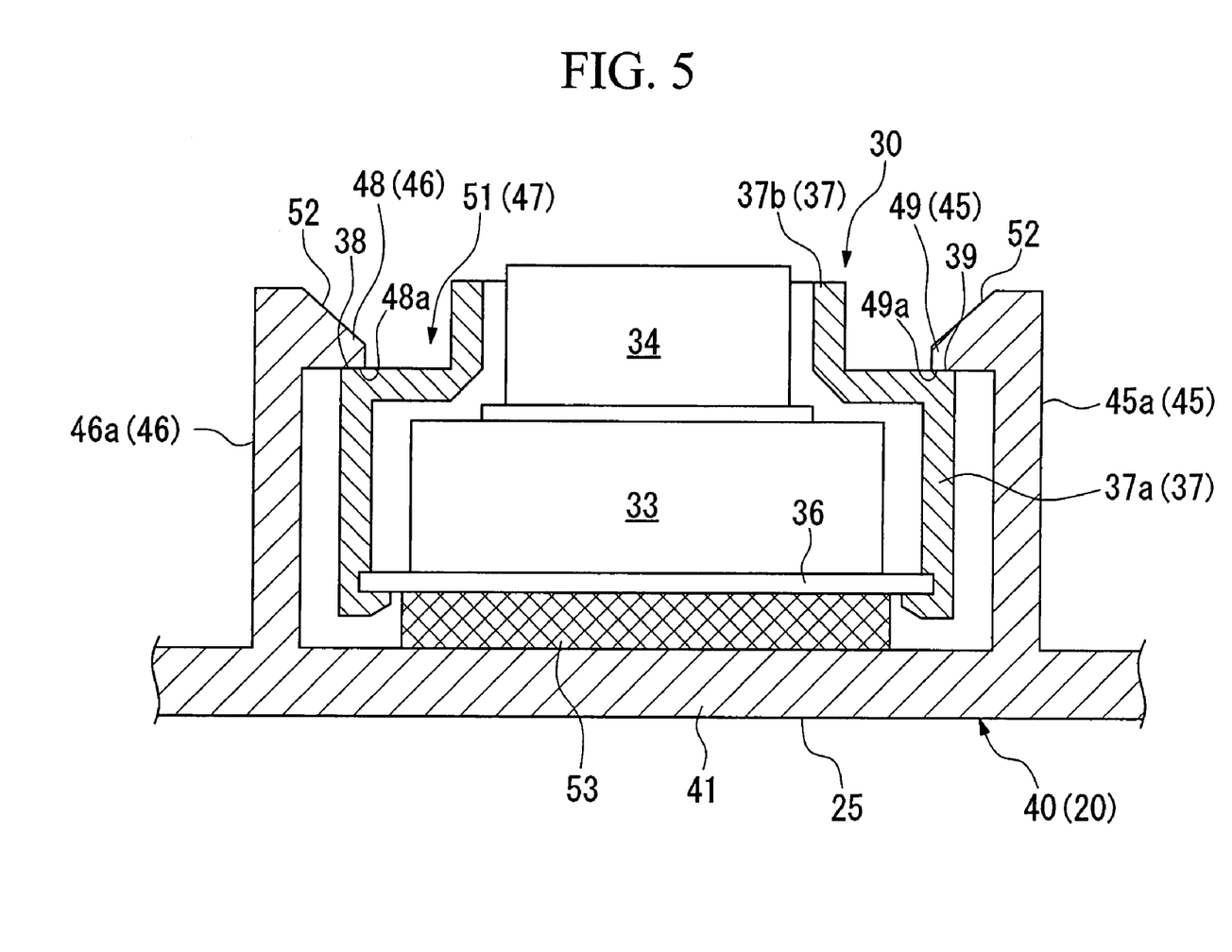
FIG. 5 is a cross-sectional view along the line A-A in FIG. 3.

As shown in FIG. 5, latching prongs 48 and 49 are each formed at the upper edge of side walls 45a and 46a, projecting toward the inside of housing part 47. Movement of camera module 30 towards an opening 51 (i.e., movement in the restoring direction of elastic member 53) is restricted as a result of each of the latching surfaces 38 and 39 of cover member 37 coming into contact with bottom surfaces 48a and 49a of latching prongs 48 and 49. Note that the phrase "restoring direction of elastic member 53" means the direction in which elastic member 53 returns from an elastically deformed state to a state in which it is not subject to any load.

Cover member 37 is disposed with clearance between it and image capturing element 33 and is open at the bottom. The periphery of substrate 36 engages cover member 37 on the inside of the bottom end, so that cover member 37 and substrate 36 are mutually joined. The peripheral surface of box-shaped part 37a of cover member 37 is formed to be parallel to the optical axis of camera module 30. This peripheral surface of box-shaped part 37a forms the outermost side surface of camera module 30, and projects downward slightly more than substrate 36. Substrate 36 is disposed to the bottom end of camera module 30. The distance between the end surfaces of latching prongs 48 and 49 is less than the distance between the surfaces of opposing sides of box-shaped part 37a of cover member 37.

Latching prongs 48 and 49 are formed such that the boundary between their top faces and end faces is cut away, to form a taper. These cut-away faces form a tapered guide surfaces (guide part) 52 that slope downward from its top to its end. Side walls 45a and 46a are able to be elastically deformed in opposing directions, to an extent that will permit passage of camera module 30 between latching prongs 48 and 49, i.e., to an extent that will permit passage of box-shaped part 37a of cover member 37 between the end surfaces of latching prongs 48 and 49. Further, when camera module 30 is introduced into housing part 47 via hole 51, the bottom end of box-shaped part 37a of cover member 37 and guide surfaces 52 are pushed into contact. In this state, when a load is applied on camera module 30 in the direction of its introduction, the bottom end of box-shaped part 37a pushes against guide surface 52, and latching parts 45 and 46 are elastically deformed in directions opposite from one another.

A flat-shaped elastic member 53 is disposed between substrate 36 of camera module 30 and front wall 41 of second housing 20. This elastic member 53 is pressed along the direction of its thickness by camera module 30 and second housing 20, such that, for example, in the case where elastic member 53 is comprised of urethane foam, it undergoes elastic deformation so that its thickness is decreased to 0.5~0.6 times its load-free state, thereby biasing camera module 30 toward the opening 51 side. By elastically deforming elastic member 53 so that its thickness is decreased to 0.5~0.6 times its load-free state, camera module 30 can be biased, with the cumulative dimensional tolerance of the peripheral parts absorbed, and an appropriate amount of elasticity remaining. Because latching surfaces 38 and 39 of cover member 37 each come into contact with bottom surfaces 48a and 49a of latching prongs 48 and 49, camera module 30 becomes fixed inside housing part 47 such that it is held horizontally and pressed against side wall 41 by latching prongs 48 and 49.

Functions of the present invention will now be explained.

When camera module 30 is introduced from opening 51 into housing part 47 of case 40, box-shaped part 37a of cover member 37 and guide surfaces 52 of latching parts 45, 46 come into contact with one another, and a load in the direction of its introduction is applied on camera module 30. As a result, box-shaped part 37a presses against guide surfaces 52, and latching parts 45 and 46 are elastically deformed in directions opposite one another. As a result, the distance between latching prongs 48 and 49 increases, and box-shaped part 37a of cover member 37 of camera module 30 is able to pass through.

Elastic member 53, for example, is provided inside housing part 47 in advance, and undergoes elastic deformation by being pressed between the front wall 41 of case 40 and the bottom end, i.e., substrate 36, of camera module 30, which is introduced into housing part 47 by passing between latching prongs 48 and 49. Once box-shaped part 37a of cover member 37 of camera module 30 has passed between latching prongs 48 and 49, latching parts 45 and 46 return to their pre-deformation state, and latching prongs 48 and 49 engage with latching surfaces 38 and 39 of cover member 37. Latching surfaces 38 and 39 come into contact with bottom surfaces 48a and 49a of latching prongs 48 and 49 under the biasing force of elastic member 53. Thus, the positioning of camera module 30 is determined by latching prongs 48 and 49. However, to carry out more precise positioning, a plurality of projections 50 are employed to determine positioning of camera module 30 in the up, down, left and right directions. As a result, latching prongs 48 and 49 engage securely with latching surfaces 38 and 39. Accordingly, camera module 30 does not rattle or experience tilting of its optical axis, but is securely held in a housed state inside housing part 47.

In the camera module attachment structure of the preceding embodiment, camera module 30 is biased by elastic member 53, and is held securely by being pressed by latching prongs 48 and 49 of latching parts 45 and 46 of second housing 20. As a result, rattling and tilting of the optical axis of camera module 30 can be eliminated, enabling excellent image capturing to be performed. In particular, by accurate management (or manufacture) of the bottom surfaces 48a and 49a of latching prongs 48 and 49 alone, it is possible to prevent tiling of the optical axis of camera module 30.

In addition, by interposing elastic member 53 between camera module 30 and second housing 20, impact loads and the like that are communicated to camera module 30 from second housing 20 can be reduced, and damage to camera module 30 can be controlled.

In addition, camera module 30 can be easily introduced into housing part 47 using the guide surfaces 52 that are formed on latching parts 45 and 46, without performing an operation to push apart latching parts 45 and 46. Further, the number of component parts and labor man-hours can be reduced as compared to the case where camera module 30 is attached in second housing 20 using projections or the like.

Moreover, camera module 30 is held as a result of the biasing force of elastic member 53 being applied to substrate 36 of camera module 30, and as a result of cover member 37 which is fixed in place on substrate 36 coming into contact with latching prongs 48 and 49. As a result, the load on the image pickup part 35 that is mounted on substrate 36 is eliminated, so that damage to image pickup part 35 or deleterious effects on its internal parts can be controlled. Further, since elastic member 53 contracts, it is possible to ease the dimensional tolerance in the direction of the optical axis of cover member 37.

In cellular phone 1 in which the above-described camera module attachment structure is employed, excellent image pickup is possible, damage to camera module 30 is limited even when an impact load is applied, and costs can be decreased as a result of the reduction in component parts and labor man-hours. Accordingly, the commercial value of cellular phone 1 can be improved.

Note that present invention is not limited to the above-described embodiments. For example, a rubber material like silicon rubber, or a coil spring or the like, may be employed for elastic member 53. Further, camera module 30 may be fixed in place in the up, down, right and left directions by joining elastic member 53 to camera module 30 and second housing 20 by bonding, etc. In this case, projections 50 may be eliminated.

In addition, the height of latching parts 45, 46 may be reduced by providing latching surfaces 38 and 39 of cover member 37 to side walls 45a and 46a. A design is also acceptable in which latching prongs and tapered surfaces are provided to camera module 30.

In the description above, camera module 30 was introduced from the substrate 36 side into housing part 47 along its optical axis. However, it is also acceptable to introduce camera module 30 from the lens surface 31 side, or from the top, bottom, left or right directions.

Camera module 30 may employ MOS or CMOS for example. Further, it is not necessary that cellular phone 1 is of the foldable type; rather, it may be a single unitary structure.

The present invention is suitably employed not only in cellular phones, but also in various portable terminal devices in which a camera module is attached, such as digital cameras, PDAs, notebook computers and the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An attachment structure for attaching a camera module to a housing, said camera module having an image capturing element portion mounted on a substrate and a lens portion provided on said image capturing element portion, said attachment structure of said camera module comprising:
    an elastic member which is elastically deformed in a thickness direction, arranged below said substrate and between said substrate and said housing; and
    a plurality of latches provided on said housing;
    wherein said camera module engages with said latch, movement of said elastic member in the restoring direction is restricted,
    a cover member which covers the image capturing element portion is provided said cover member having an opening,
    each of said latches comprises a second elastic member standing at a periphery of an attachment area of said housing to which the camera module is attached, and a prong portion which can engage with a latching surface of said cover member,
    said prong portion being provided on said second elastic member and projecting towards said latching surface, the plurality of second elastic members are elastically deformed, the camera module is allowed to pass through a space between the second elastic members, and attachment of the camera module to the attachment area of the housing is permitted.

2. An attachment structure for attaching a camera module according to claim 1,
    wherein a guide surface for guiding said camera module, is formed on said prong portion, said guide surface having a slanted shape between a tip surface and an end surface of said prong portion.

3. A portable terminal device comprising:
    a camera module having an image capturing element portion mounted on a substrate and a lens portion provided on said image capturing element portion; and
    a housing to which said camera module is attached;
    said housing comprising:
        a first casing into which said camera module is attached; and
        a second casing for covering said first casing, and forming an open area for the lens portion;

wherein said camera module is attached to said housing using the attachment structure for attaching a camera module according to claim 1.

4. A portable terminal device comprising:

a camera module having an image capturing element portion mounted on a substrate and a lens portion provided on said image capturing element portion; and a housing to which said camera module is attached;

said housing comprising:

a first casing into which said camera module is attached; and a second casing for covering said first casing, and forming an open area for the lens portion;

said camera module comprising:

an elastic member which is elastically deformed in a thickness direction, arranged between said substrate and said housing; and a plurality of latching portions provided on said housing;

wherein said camera module engages with said latching portion, movement of said elastic member in the restoring direction is restricted, a cover member which covers the image capturing element portion, said cover member having an opening, each of said latching portions comprises a second elastic member standing at a periphery of an attachment area of said housing to which the camera module is attached, and a prong portion which can engage with a latching surface of said cover member, said prong portion being provided on said second elastic member and projecting towards said latching surface, the plurality of second elastic members are elastically deformed, the camera module is allowed to pass through a space between the second elastic members, and attachment of the camera module to the attachment area of the housing is permitted.

5. A portable terminal device according to claim 4 wherein a guide surface for guiding said camera module, is formed on said prong portion, said guide surface having a slanted shape between a tip surface and an end surface of said prong portion.

6. A camera comprising:

a camera module having an image capturing element portion mounted on a substrate and a lens portion provided on said image capturing element portion; and a housing to which said camera module is attached;

said housing comprising:

a first casing into which said camera module is attached; and a second casing for covering said first casing, and forming an open area for the lens portion;

wherein said camera module is attached to said housing using the attachment structure for attaching a camera module according to claim 1.

* * * * *